United States Patent
Mizukawa et al.

(10) Patent No.: US 10,249,887 B2
(45) Date of Patent: Apr. 2, 2019

(54) FUEL CELL

(71) Applicant: Sumitomo Precision Products Co., Ltd., Amagasaki-shi, Hyogo (JP)

(72) Inventors: Shigeru Mizukawa, Amagasaki (JP); Takashi Murata, Amagasaki (JP); Hiroyuki Uwani, Amagasaki (JP); Takayuki Sugimori, Amagasaki (JP)

(73) Assignee: Sumitomo Precision Products Co., Ltd., Amagasaki-shi (JP)

( * ) Notice: Subject to any disclaimer, the term of this patent is extended or adjusted under 35 U.S.C. 154(b) by 63 days.

(21) Appl. No.: 15/551,728

(22) PCT Filed: Feb. 22, 2016

(86) PCT No.: PCT/JP2016/054994
§ 371 (c)(1),
(2) Date: Aug. 17, 2017

(87) PCT Pub. No.: WO2016/147799
PCT Pub. Date: Sep. 22, 2016

(65) Prior Publication Data
US 2018/0034072 A1    Feb. 1, 2018

(30) Foreign Application Priority Data
Mar. 17, 2015    (JP) ................... 2015-053366

(51) Int. Cl.
*H01M 8/0271*    (2016.01)
*H01M 8/24*    (2016.01)
*H01M 8/02*    (2016.01)
*H01M 8/12*    (2016.01)

(52) U.S. Cl.
CPC .......... *H01M 8/0271* (2013.01); *H01M 8/02* (2013.01); *H01M 8/24* (2013.01); *H01M 8/12* (2013.01)

(58) Field of Classification Search
None
See application file for complete search history.

(56) References Cited

FOREIGN PATENT DOCUMENTS

JP    2013-65497 A    4/2013

OTHER PUBLICATIONS

International Search Report (PCT/ISA/210) issued in PCT Application No. PCT/JP2016/054994 dated May 10, 2016 with English translation (five pages).
Japanese-language Written Opinion (PCT/ISA/237) issued in PCT Application No. PCT/JP2016/054994 dated May 10, 2016 (three pages).

*Primary Examiner* — Sarah A. Slifka
(74) *Attorney, Agent, or Firm* — Crowell & Manning LLP

(57) ABSTRACT

In this fuel cell, a cell holder (40) is provided with an inflow passage (44) for allowing flow into a frame of the cell holder (40), and a convex support (34) for supporting an insulating portion (50) and a first seal member (60) is provided in the inflow passage (44).

10 Claims, 10 Drawing Sheets

SECTIONAL VIEW TAKEN ALONG LINE 300-300

FUEL CELL

TECHNICAL FIELD

The present invention relates to a fuel cell.

BACKGROUND ART

In general, a fuel cell as disclosed in Japanese Patent Laid-Open No. 2013-065497 is known. The fuel cell described in Japanese Patent Laid-Open No. 2013-065497 is provided with a single battery cell and a pair of interconnectors provided on the fuel electrode side and the air electrode side of the single battery cell, respectively. Between the pair of interconnectors, a cell holder, an insulating portion, and a gas seal separator are provided to surround the single battery cell. The gas seal separator is provided to lie across the insulating portion and the single battery cell, and shuts off the fuel electrode side and the air electrode side of the single battery cell.

When the gas seal separator is made of a metal foil having a relatively small thickness, there is such a disadvantage that the gas seal separator deforms to be corrugated. Thus, in the fuel cell described in Japanese Patent Laid-Open No. 2013-065497, corrugated deformation is suppressed by coating both surfaces of the gas seal separator with titanium oxide.

PRIOR ART

Patent Document

Patent Document 1: Japanese Patent Laid-Open No. 2013-065497

SUMMARY OF THE INVENTION

Problem to be Solved by the Invention

However, in the fuel cell described in Japanese Patent Laid-Open No. 2013-065497, it is necessary to coat (process) both the surfaces of the gas seal separator (seal member) with titanium oxide. In other words, it is necessary to use a special seal member. Therefore, it is desired to suppress corrugated deformation of the seal member without performing processing on the seal member.

The present invention has been proposed in order to solve the aforementioned problem, and one object of the present invention is to provide a fuel cell capable of suppressing corrugated deformation of a seal member without performing processing on the seal member.

Means for Solving the Problem

In order to attain the aforementioned object, in a fuel cell according to an aspect of the present invention, the power generation units each include a cell formed with a cathode on at least one surface, a frame-shaped cell holder provided to surround an outside of the cell, an insulating portion provided on a surface of the cell holder, and a first seal member provided to lie across the cell and the insulating portion not to contact the cathode of the cell, the cell holder is provided with an inflow passage for allowing fuel gas to flow into a frame of the cell holder from a fuel gas manifold provided on an outer peripheral side, and a convex support for supporting the insulating portion and the first seal member is provided in the inflow passage.

In the fuel cell according to the aspect of the present invention, as hereinabove described, the convex support for supporting the insulating portion and the first seal member is provided in the inflow passage. Accordingly, deformation of the insulating portion to sag to the inflow passage side is suppressed, and hence generation of a gap between the insulating portion and the first seal member is suppressed. Consequently, corrugated deformation of the first seal member can be suppressed without performing processing on the first seal member.

In the aforementioned fuel cell according to this aspect, the cell is preferably formed with an anode on a surface opposite to the surface on which the cathode is formed, the power generation units each preferably further include an anode connection electrically connected to the anode of the cell and a cathode connection electrically connected to the cathode of the cell, the convex support is preferably provided on a portion of the anode connection that corresponds to the inflow passage of the frame-shaped cell holder, and the convex support provided on the anode connection preferably supports the insulating portion and the first seal member through the inflow passage. According to this structure, the convex support can be easily arranged in the inflow passage of the frame-shaped cell holder by stacking the frame-shaped cell holder and the anode connection.

In the aforementioned fuel cell according to this aspect, the convex support preferably has a substantially circular shape in a planar view. According to this structure, as compared with the case where the convex support is oval, an area occupied by the convex support with respect to the inflow passage can be reduced, and hence a reduction in a region in the inflow passage into which the fuel gas can flow can be suppressed.

In this case, a tip of the convex support is preferably substantially spherical or substantially truncated-cone-shaped with rounded corners. According to this structure, unlike the case where the tip of the convex support has a pointed shape, damage of the insulating portion can be suppressed.

In the aforementioned fuel cell according to this aspect, a plurality of convex supports is preferably provided for the single inflow passage. According to this structure, when the inflow passage is relatively large, the insulating portion and the first seal member can be supported in a stable state.

In this case, a width of a gap between the plurality of convex supports is preferably larger than a width of each of the convex supports in a direction perpendicular to a direction in which the convex supports protrude. According to this structure, an increase in the resistance to inflow of the fuel gas caused by a reduction in the width of the gap between the plurality of convex supports can be suppressed.

The aforementioned fuel cell according to this aspect preferably further includes a second seal member provided between the cell holder and the insulating portion, and a protrusion height of the convex support is preferably not more than a thickness obtained by adding a thickness of the cell holder and a thickness of the second seal member. According to this structure, excessive upward pushing of the insulating portion by the convex support caused by the protrusion height of the convex support more than the thickness obtained by adding the thicknesses of the cell holder and the thickness of the second seal member and generation of the gap between the first seal member and the insulating portion or the like can be suppressed.

In the aforementioned fuel cell according to this aspect, the power generation units each preferably further include an anode connection electrically connected to an anode of the cell and a cathode connection electrically connected to the cathode of the cell, the anode connection and the cathode connection electrically connected to the cathode of another power generation unit to be stacked are preferably integrally formed, and preferably also serve as a separator for separating an adjacent power generation unit, and the convex support is preferably formed by pressing the separator. According to this structure, the anode connection and the cathode connection are integrally formed such that the number of components constituting the fuel cell can be reduced. Furthermore, the convex support is formed by pressing the separator such that as compared with the case where the convex support provided separately from the separator is mounted on the separator, the number of components constituting the fuel cell can be reduced. Furthermore, the convex support can be easily formed by pressing.

In this case, a recess is preferably formed on a back side of the convex support formed by pressing, and a release passage for releasing, to an outside of the separator, air that flows into the recess from an air manifold provided on an outer peripheral side of the separator is preferably provided on a portion of the separator near the recess. According to this structure, in the event of an abnormality such as weak bonding around the recess, mixing of the air with the fuel gas through the recess from the air manifold can be suppressed by the release passage.

In the aforementioned fuel cell according to this aspect, a glass-based bonding material is preferably arranged on a surface of the first seal member. According to this structure, the bonding strength between the first seal member and the insulating portion can be increased by the glass-based bonding material.

Effect of the Invention

According to the present invention, as hereinabove described, corrugated deformation of the seal member can be suppressed without performing processing on the seal member.

MODES FOR CARRYING OUT THE INVENTION

Embodiments of the present invention are hereinafter described on the basis of the drawings.

First Embodiment (Structure of Fuel Cell)

The structure of a fuel cell 100 according to a first embodiment is now described with reference to FIGS. 1 to 11. The fuel cell 100 is a solid oxide fuel cell (SOFC). Furthermore, the fuel cell 100 is configured by stacking a plurality of power generation units 10. In the following, the structure of one power generation unit 10 is described. Note that FIGS. 2 and 3 are schematic sectional views in which a size (thickness) in a direction Z is greatly exaggerated to make each component more visible.

Figure 1:
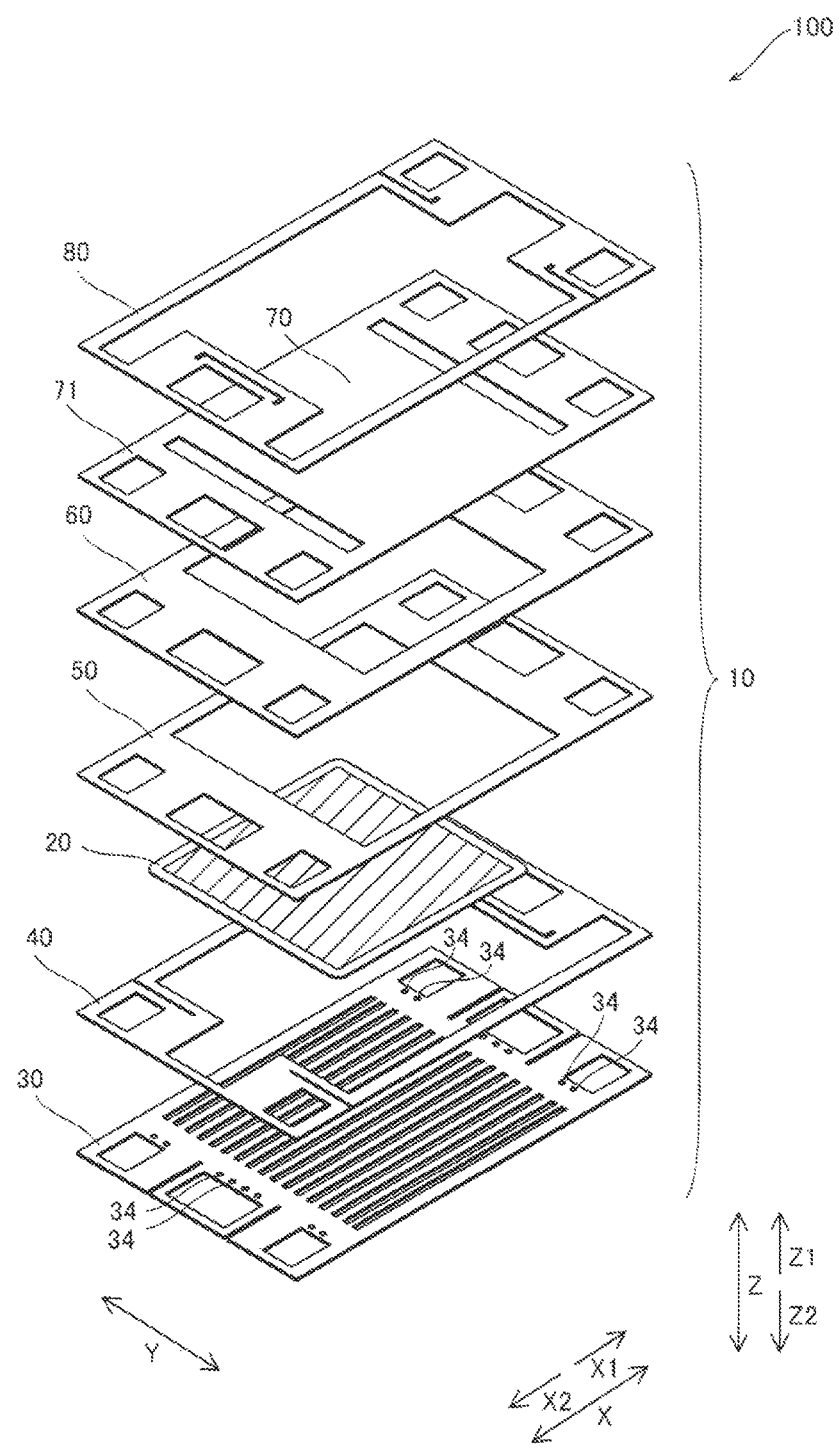
FIG. 1 An exploded perspective view of a fuel cell according to a first embodiment of the present invention.

As shown in FIG. 1, the power generation unit 10 is provided with a cell 20, a separator 30, a cell holder 40, an insulating portion 50, a cell retainer 60, a current collector plate 70 (current collector plate outer frame 71), and a press holder 80. The cell retainer 60 is an example of a "first seal member" in the present invention.

Figure 2:
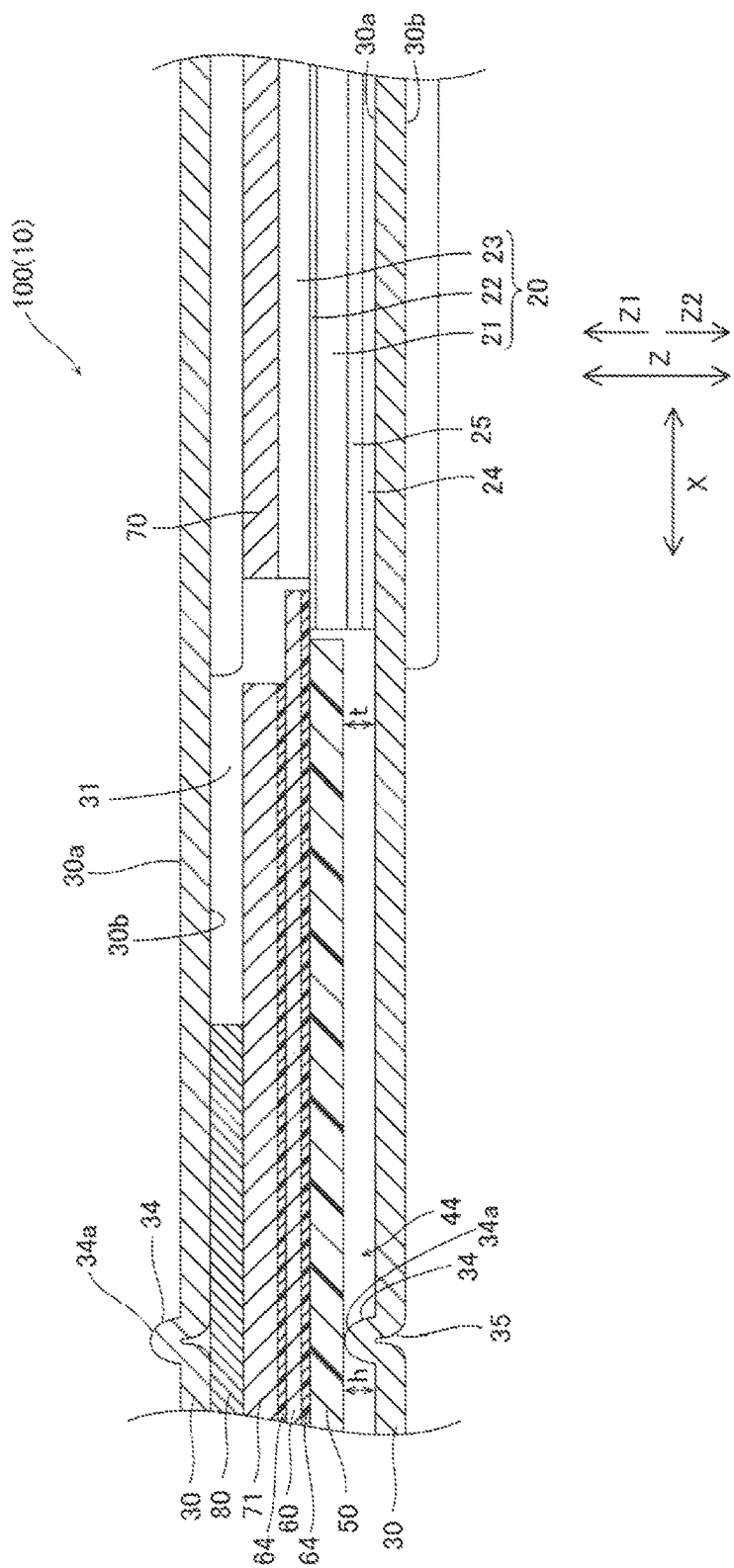
FIG. 2 A schematic sectional view (a sectional view of the fuel cell cut along the line 300-300 in FIG. 6) of the fuel cell according to the first embodiment of the present invention.
Figure 3:
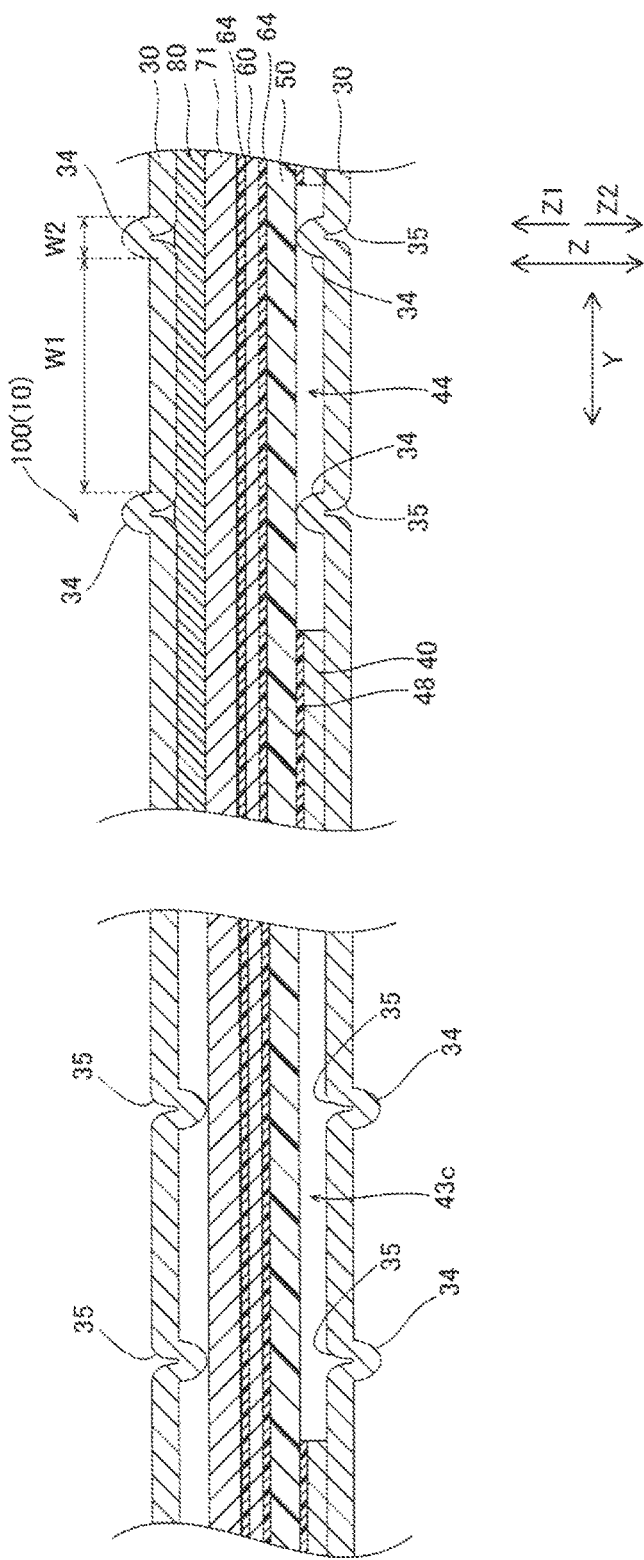
FIG. 3 A schematic sectional view (a sectional view of the fuel cell cut along the 400-400 line in FIG. 6) of the fuel cell according to the first embodiment of the present invention.
Figure 4:
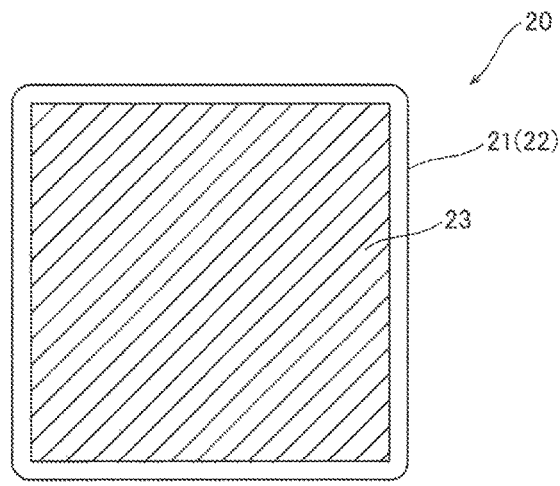
FIG. 4 A plan view of a cell of the fuel cell according to the first embodiment of the present invention.

As shown in FIGS. 2 and 4, the cell 20 includes the anode 21, a solid electrolyte layer 22, and a cathode 23. Incidentally, the cell 20 is formed with the cathode 23 on at least one surface (a surface on a Z1 direction side) and the anode 21 on a surface (a surface on a Z2 direction side) opposite to the surface on which the cathode 23 is formed. The anode 21 is provided on a substantially entire surface of the solid electrolyte layer 22 on the Z2 direction side. The cathode 23 is provided on a portion of a surface of the solid electrolyte layer 22 on the Z1 direction side. Furthermore, on the Z2 direction side of the anode 21, a gas diffusion plate 24 and an anode-side current collector member 25 are arranged.

As shown in FIG. 2, the separator 30 is arranged to be electrically connected to the anode 21 of the cell 20 through the gas diffusion plate 24 and the anode-side current collector member 25. Specifically, a surface 30a of the separator 30 on the Z1 direction side is electrically connected to the anode 21 through the gas diffusion plate 24 and the anode-side current collector member 25. The surface 30a is an example of an "anode connection" in the present invention.

According to the first embodiment, the surface 30a of the separator 30 on the Z1 direction side is electrically connected to the anode 21 of the cell 20, and a surface 30b of the separator 30 on the Z2 direction side is electrically connected to a cathode 23 of another power generation unit 10 stacked on the Z2 direction side. That is, a portion electrically connected to the anode 21 of the cell 20 and a portion connected to the cathode 23 are integrally formed, and also serve as the separator 30 for separating an adjacent power generation units 10. Furthermore, the separator 30 is made of stainless steel, for example. The surface 30b is an example of a "cathode connection" in the present invention.

Figure 5:
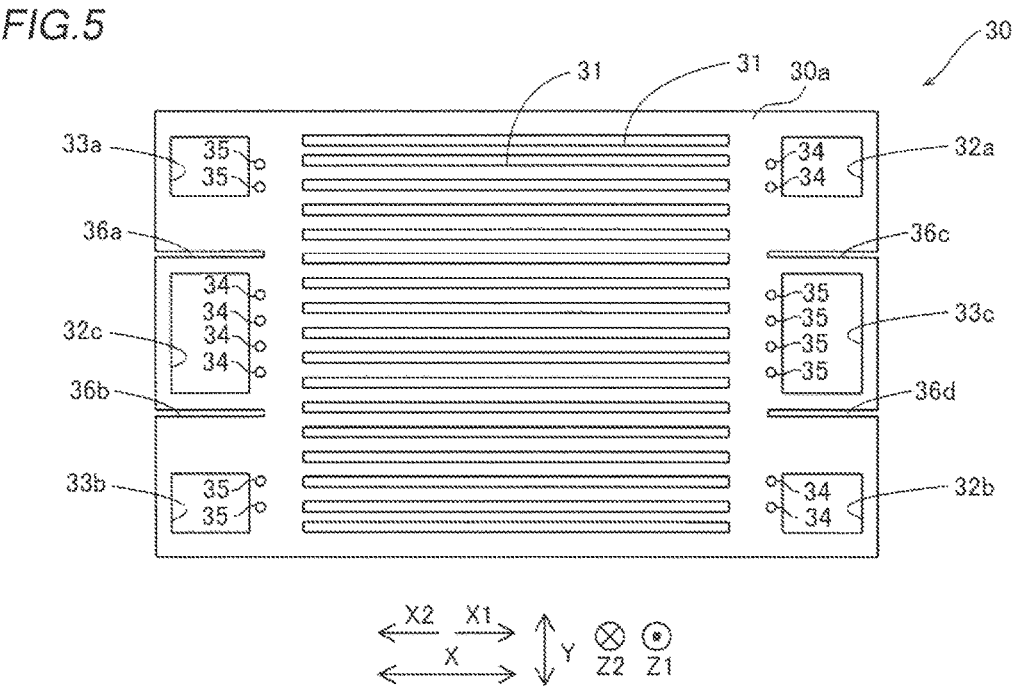
FIG. 5 A plan view of a separator of the fuel cell according to the first embodiment of the present invention.

As shown in FIG. 5, the separator 30 is provided, by pressing, with a plurality of grooves 31 provided to extend along a direction X. The separator 30 is also provided with two fuel gas inlets 32a and 32b and one fuel gas outlet 32c. Fuel gas flowing in from the fuel gas inlets 32a and 32b flows out from the fuel gas outlet 32c through the grooves 31.

The separator 30 is also provided with two air inlets 33a and 33b and one air outlet 33c. The fuel gas flows on the surface 30a of the separator 30 on the Z1 direction side from an X1 direction side to an X2 direction side, and air flows on the surface 30b of the separator 30 on the Z2 direction side from the X2 direction side to the X1 direction side. That is, the fuel gas and the air flow in opposite directions (counterflow).

Figure 6:
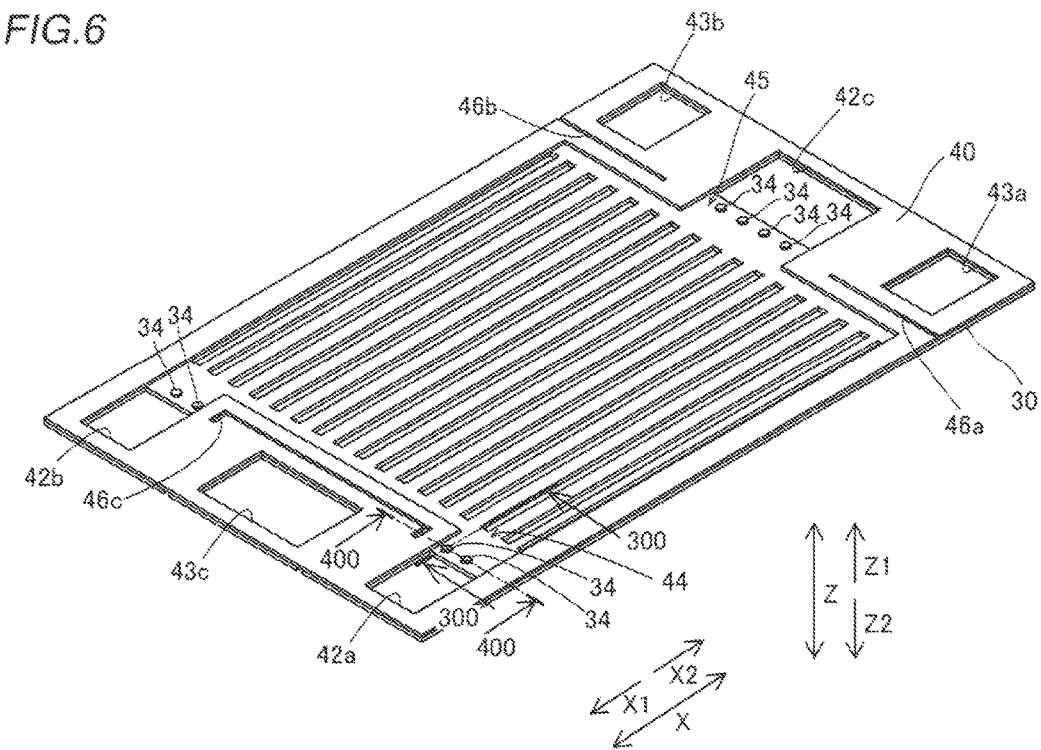
FIG. 6 A perspective view of a state where a cell holder is stacked on the separator of the fuel cell according to the first embodiment of the present invention.

According to the first embodiment, on a portion of the surface 30a of the separator 30 that corresponds to an inflow passage 44 (see FIG. 6) of the frame-shaped cell holder 40, convex supports 34 for supporting the insulating portion 50 and the cell retainer 60 are provided. Specifically, in a state where the cell holder 40 is stacked on the separator 30, as shown in FIG. 6, the convex supports 34 are provided (arranged) in the inflow passage 44, described later, on the separator 30. The convex supports 34 provided on the surface 30a of the separator 30 support the insulating portion 50 and the cell retainer 60 through the inflow passage 44 of the cell holder 40 from the Z2 direction side (see FIG. 2). Furthermore, the convex supports 34 support the insulating portion 50 and the cell retainer 60 through an outflow passage 45 in addition to the inflow passage 44 of the cell holder 40 from the Z2 direction side. The convex supports 34 have a function of rectifying the fuel gas that flows through the inflow passage 44 (outflow passage 45).

According to the first embodiment, as shown in FIG. 5, the convex supports 34 are substantially circular in a planar view. As shown in FIG. 2, tips 34a of the convex supports 34 each are substantially spherical.

According to the first embodiment, as shown in FIGS. 5 and 6, a plurality of convex supports 34 is provided for the single inflow passage 44 (outflow passage 45) of the separator 30. Specifically, two convex supports 34 are provided along a direction Y in the vicinity of each of the flue gas inlets 32a and 32b. Furthermore, four convex supports 34 are provided along the direction Y in the vicinity of the single fuel gas outlet 32c. As shown in FIG. 3, the width W1 of a gap between the plurality of convex supports 34 is larger than the width W2 of each of the convex supports 34 in a direction (horizontal direction) perpendicular to a direction (direction Z) in which the convex supports 34 protrude.

According to the first embodiment, the convex supports 34 are formed by pressing the separator 30. Specifically, the convex supports 34 are formed by pressing such that the separator 30 protrudes to the Z1 direction side. Incidentally, recesses 35 are formed on the back sides of the convex supports 34 formed by pressing. In the vicinity of the air inlets 33a and 33b and the air outlet 33c, a plurality of recesses 35 is formed along the direction Y. This plurality of recesses 35 is formed by pressing such that the separator 30 protrudes to the Z2 direction side.

According to the first embodiment, notches 36a to 36d for releasing, to the outside of the separator 30, the air that flows into the recesses 35 from the air inlets 33a and 33b provided on the outer peripheral side of the separator 30 are provided on portions of the separator 30 near the recesses 35. The notches 36a to 36d are examples of a "release passage" in the present invention. The notches 36a and 36b are formed to extend along the direction X between the air inlets 33a and 33b and the fuel gas outlet 32c, respectively. Furthermore, the notches 36c and 36d are formed to extend along the direction X between the fuel gas inlets 32a and 32b and the air outlet 33c, respectively.

Figure 7:
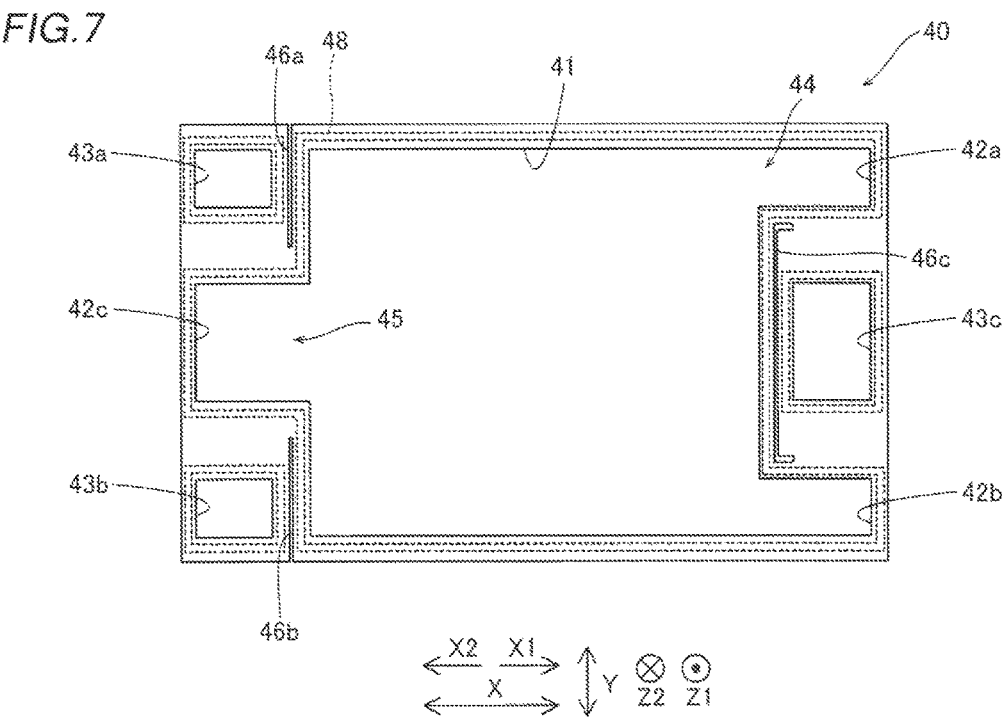
FIG. 7 A plan view of the cell holder of the fuel cell according to the first embodiment of the present invention.

As shown in FIG. 2, the frame-shaped cell holder 40 is provided to surround the outside of the cell 20. Specifically, as shown in FIG. 7, an opening 41 is provided in a central portion of the cell holder 40, and the cell 20 is arranged within the opening 41. Incidentally, the cell holder 40 is made of stainless steel, for example.

The cell holder 40 is provided with two fuel gas inlets 42a and 42b and one fuel gas outlet 42c. In addition, the cell holder 40 is provided with two air inlets 43a and 43b and one air outlet 43c. According to the first embodiment, the frame-shaped cell holder 40 is provided with the inflow passage 44 for allowing the fuel gas to flow into a frame of the cell holder 40 from the fuel gas inlets 42a and 42b provided on the outer peripheral side (X1 direction side). As shown in FIG. 6, the convex supports 34 of the separator 30 are provided (arranged) in the inflow passage 44. Furthermore, the two fuel gas inlets 42a and 42b and the inflow passage 44 are communicated with each other, and surround the air outlet 43c. The fuel gas inlets 42a and 42b are examples of a "fuel gas manifold" in the present invention. The air inlets 43a and 43b are examples of an "air manifold" in the present invention.

The frame-shaped cell holder 40 is provided with the outflow passage 45 communicated with the fuel gas outlet 42c. As shown in FIG. 6, the convex supports 34 of the separator 30 are provided (arranged) in the outflow passage 45.

As shown in FIG. 7, notches 46a to 46c for releasing, to the outside of the cell holder 40, the air that flows into the recesses 35 is provided at (or near) positions that correspond to the recesses 35 of the separator 30. The Notches 46a and 46b are formed to extend along the direction Y. The notch 46c is substantially U-shaped. Furthermore, the notches 46a and 46b are communicated with the notches 36a and 36b of the separator 30. The notch 46c is communicated with the notches 36c and 36d of the separator 30.

The fuel gas that has flowed in from the inflow passage 44 collides with an end surface of the cell 20 and changes its path downward (Z2 direction side), and thereafter moves into the grooves 31 of the separator 30 along a surface of the cell holder 40 on the Z2 direction side. Then, the fuel gas changes its path upward (Z1 direction side) on the X2 direction side of the cell 20, and thereafter flows out from the fuel gas outlet 42c.

As shown in FIG. 7, a holder seal 48 is provided on a surface of the cell holder 40. The holder seal 48 is provided to surround the fuel gas inlets 42a and 42b, the fuel gas outlet 42c, and the opening 41 of the cell holder 40. Furthermore, the holder seal 48 is provided to surround each of the air inlets 43a and 43b of the cell holder 40 and to surround the air outlet 43c. The holder seal 48 is an example of a "second seal member" in the present invention.

According to the first embodiment, as shown in FIG. 2, the holder seal 48 is provided between the cell holder 40 and the insulating portion 50, and the protrusion height h of each of the convex supports 34 is not more than a thickness t obtained by adding the thickness of the cell holder 40 and the thickness of the holder seal 48. Specifically, the protrusion height h of each of the convex supports 34 and the thickness t are equal to each other (h=t). The thickness of the holder seal 48 prior to being arranged between the cell holder 40 and the insulating portion 50 is larger than the interval of a gap between the cell holder 40 and the insulating portion 50.

Figure 8:
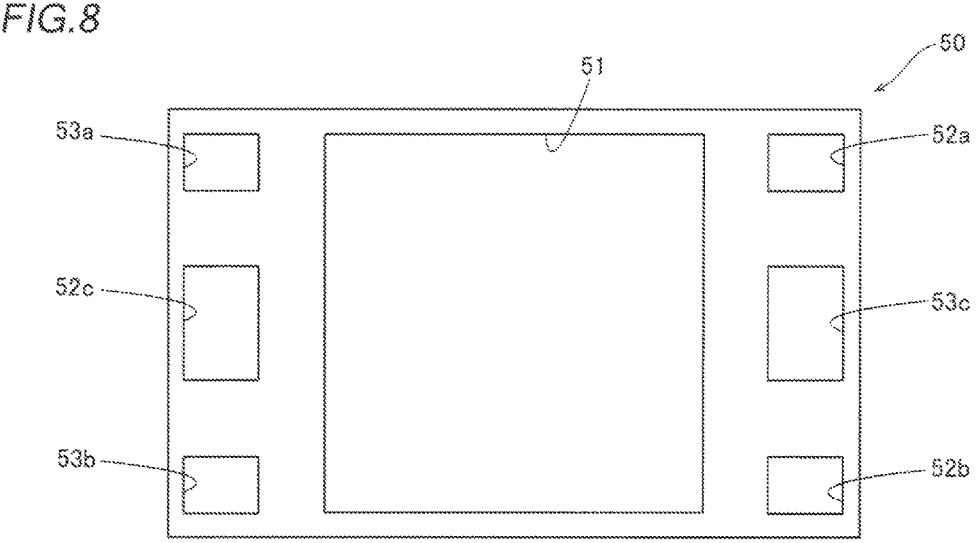
FIG. 8 A plan view of an insulating portion of the fuel cell according to the first embodiment of the present invention.

As shown in FIG. 2, the insulating portion 50 is provided on the surface (Z1 direction side) of the cell holder 40. The insulating portion 50 is made of mica. As shown in FIG. 8, the insulating portion 50 is provided with an opening 51 in which the cell 20 is arranged, fuel gas inlets 52a and 52b, a fuel gas outlet 52c, air inlets 53a and 53b, and an air outlet 53c.

Figure 9:
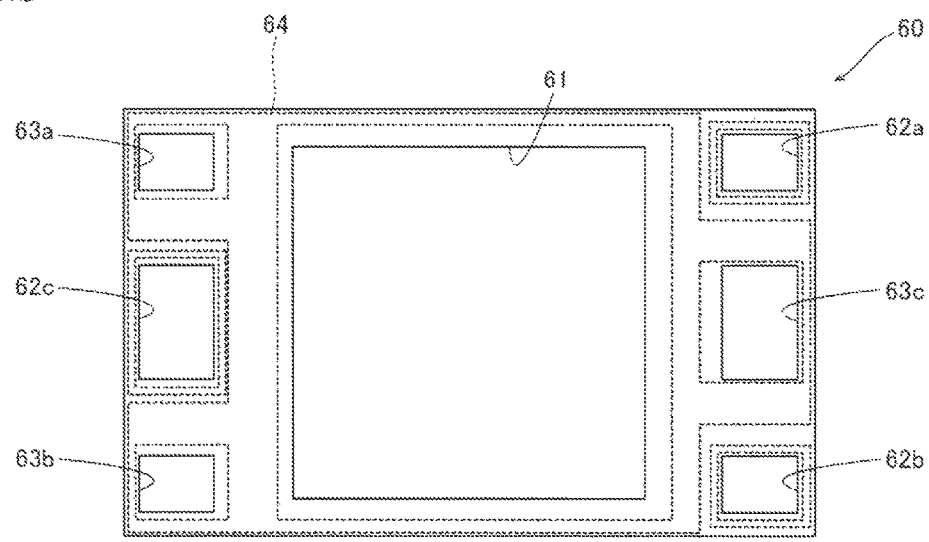
FIG. 9 A plan view of a cell retainer of the fuel cell according to the first embodiment of the present invention.

As shown in FIG. 2, the cell retainer 60 is provided to lie across the cell 20 and the insulating portion 50 not to contact the cathode 23 of the cell 20. Incidentally, the cell retainer 60 is made of a stainless steel foil, for example. As shown in FIG. 9, an opening 61 smaller than the size of the cell 20 is provided in a central portion of the cell retainer 60 in a planar view. The size of the opening 61 is smaller than the size of the cell 20 such that the cell retainer 60 is provided to lie across the cell 20 and the insulating portion 50. Furthermore, on the outer peripheral side of the cell retainer 60, fuel gas inlets 62a and 62b, a fuel gas outlet 62c, air inlets 63a and 63b, and an air outlet 63c are provided.

According to the first embodiment, as shown in FIG. 2, a glass-based bonding material 64 is arranged on a surface (both sides) of the cell retainer 60. As shown in FIG. 9, the glass-based bonding material 64 is provided to surround each of the opening 61, the fuel gas inlets 62a and 62b, the fuel gas outlet 62c, the air inlet 63a and 63b, and the air outlet 63c.

As shown in FIG. 2, the current collector plate 70 is arranged on a surface (Z1 direction side) of the cathode 23 of cell 20. The current collector plate outer frame 71 is provided to surround the current collector plate 70. Note that the current collector plate 70 and the current collector plate outer frame 71 are formed at the same time by processing one plate material. Furthermore, the current collector plate 70 and the current collector plate outer frame 71 are made of stainless steel, for example.

Figure 10:
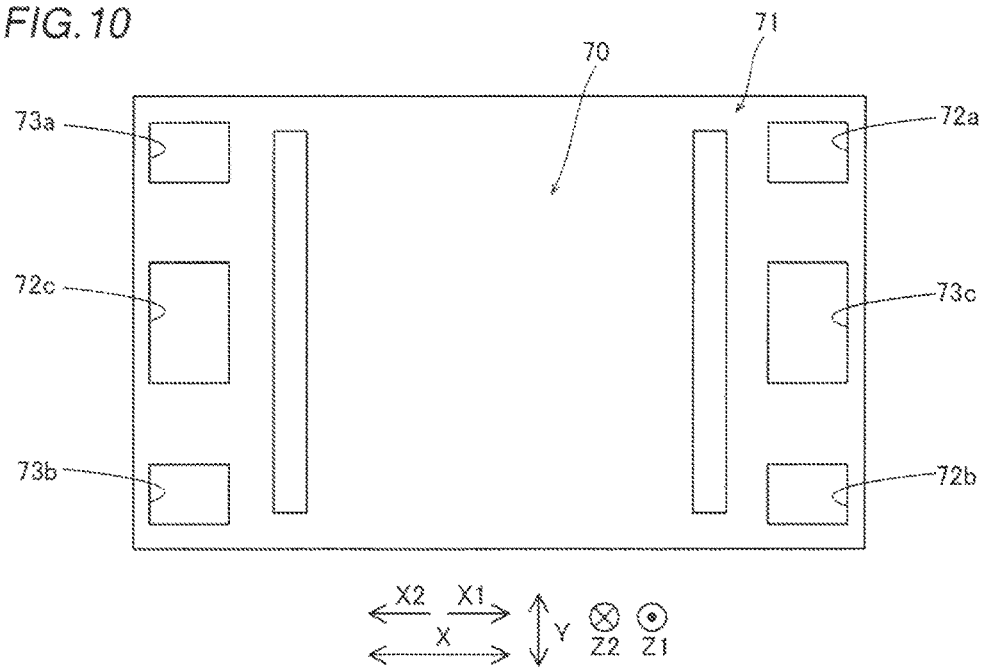
FIG. 10 A plan view of a current collector plate and a current collector plate outer frame of the fuel cell according to the first embodiment of the present invention.

As shown in FIG. 10, fuel gas inlets 72a and 72b, a fuel gas outlet 72c, air inlets 73a and 73b, and an air outlet 73c are provided on the outer peripheral side of the current collector plate outer frame 71.

Figure 11:
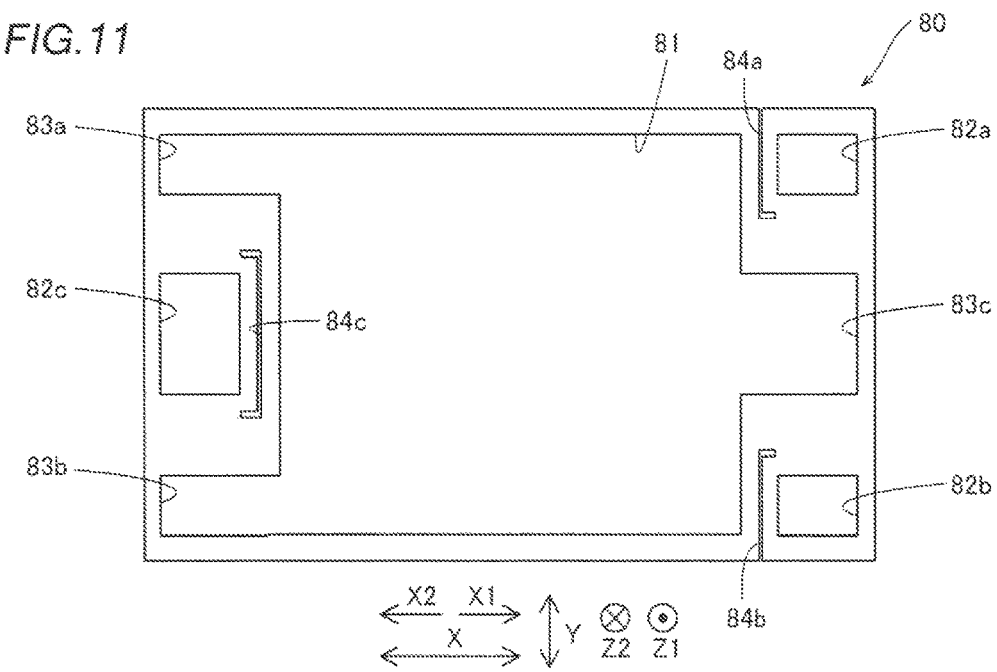
FIG. 11 A plan view of a press holder of the fuel cell according to the first embodiment of the present invention.

As shown in FIG. 2, the press holder 80 is arranged on a surface (Z1 direction side) of the current collector plate outer frame 71. The press holder 80 is made of stainless steel, for example. As shown in FIG. 11, an opening 81 is provided in a central portion of the press holder 80 such that the current collector plate 70 is exposed. Furthermore, fuel gas inlets 82a and 82b, a fuel gas outlet 82c, air inlets 83a and 83b, and an air outlet 83c are provided on the outer peripheral side of the press holder 80.

The press holder 80 is provided with notches 84a to 84c for releasing, to the outside of the separator 30, the air that flows into the recesses 35 of the separator 30 (the separator 30 electrically connected to an anode 21 of another power generation unit 10 stacked on the Z1 direction side). The notches 84a to 84c are provided at positions that correspond to the recesses 35 of the separator 30.

As shown in FIG. 2, the separator 30 electrically connected to the anode 21 of another power generation unit 10 stacked on the Z1 direction side is arranged on a surface (Z1 direction side) of the press holder 80. The lower surfaces of the grooves 31 of the separator 30 and the current collector plate 70 are in contact with each other (conducting).

(Effects of First Embodiment)

According to the first embodiment, the following effects can be obtained.

According to the first embodiment, as hereinabove described, the convex supports 34 for supporting the insulating portion 50 and the cell retainer 60 are provided in the inflow passage 44. Accordingly, deformation of the insulating portion 50 to sag to the inflow passage 44 side is suppressed, and hence generation of a gap between the insulating portion 50 and the cell retainer 60 is suppressed. Consequently, corrugated deformation of the seal member can be suppressed without performing processing on the cell retainer 60.

According to the first embodiment, as hereinabove described, the convex supports 34 are provided on the portion of the surface 30a of the separator 30 that corresponds to the inflow passage 44 of the frame-shaped cell holder 40, and the convex supports 34 provided on the surface 30a of the separator 30 supports the insulating portion 50 and the cell retainer 60 through the inflow passage 44. Accordingly, the convex supports 34 can be easily arranged in the inflow passage 44 of the frame-shaped cell holder 40 by stacking the frame-shaped cell holder 40 and the separator 30 (the surface 30a).

According to the first embodiment, as hereinabove described, the convex supports 34 each have the substantially circular shape in the planar view. Accordingly, as compared with the case where the convex supports 34 are oval, an area occupied by the convex supports 34 with respect to the inflow passage 44 can be reduced, and hence a reduction in a region in the inflow passage 44 into which the fuel gas can flow can be suppressed.

According to the first embodiment, as hereinabove described, the tips 34a of the convex supports 34 are substantially spherical. Accordingly, unlike the case where the tips of the convex supports 34 each have a pointed shape, damage of the insulating portion 50 can be suppressed.

According to the first embodiment, as hereinabove described, the plurality of convex supports 34 is provided for the single inflow passage 44. Accordingly, when the inflow passage 44 is relatively large, the insulating portion 50 and the cell retainer 60 can be supported in a stable state.

According to the first embodiment, as hereinabove described, the width W1 of the gap between the plurality of convex supports 34 is larger than the width W2 of each of the convex supports 34 in the direction perpendicular to the direction in which the convex supports 34 protrude. Accordingly, an increase in the resistance to inflow of the fuel gas caused by a reduction in the width W1 of the gap between the plurality of convex supports 34 can be suppressed.

According to the first embodiment, as hereinabove described, the holder seal 48 is provided between the cell holder 40 and the insulating portion 50, and the protrusion height h of each of the convex supports 34 is not more than the thickness t obtained by adding the thickness of the cell holder 40 and the thickness of the holder seal 48. Accordingly, excessive upward pushing of the insulating portion 50 by the convex supports 34 caused by the protrusion height h of each of the convex supports 34 more than the thickness t obtained by adding the thicknesses of the cell holder 40 and the thickness of the holder seal 48 and generation of the gap between the cell retainer 60 and the insulating portion 50 or the like can be suppressed.

According to the first embodiment, as hereinabove described, the surface 30a of the separator 30 and the surface 30b of the separator 30 electrically connected to the cathode 23 of another power generation unit 10 to be stacked are integrally formed and also serve as the separator 30 for separating the adjacent power generation unit 10, and the convex supports 34 are formed by pressing the separator 30. Accordingly, the surface 30a of the separator 30 and the surface 30b of the separator 30 are integrally formed such that the number of components constituting the fuel cell 100 can be reduced. Furthermore, the convex supports 34 are formed by pressing the separator 30 such that as compared with the case where the convex supports 34 provided separately from the separator 30 are mounted on the separator 30, the number of components constituting the fuel cell 100 can be reduced. Furthermore, the convex supports 34 can be easily formed by pressing.

According to the first embodiment, as hereinabove described, the recesses 34 are formed on the back sides of the convex supports 34 formed by pressing, and the notches 36a to 36d for releasing, to the outside of the separator 30, the air that flows into the recesses 35 from the air inlets 33a and 33b provided on the outer peripheral side of the separator 30 are provided on the portions of the separator 30 near the recesses 35. Accordingly, in the event of an abnormality such as weak bonding around the recesses 35, mixing of the air with the fuel gas through the recesses 35 from the air inlets 33a and 33b can be suppressed by the notches 36a to 36d.

According to the first embodiment, as hereinabove described, the glass-based bonding material 64 is arranged on the surface of the cell retainer 60. Accordingly, the bonding strength between the cell retainer 60 and the insulating portion 50 (the current collector plate outer frame 71) can be increased by the glass-based bonding material 64.

Second Embodiment (Structure of Fuel Cell)

The structure of a fuel cell 110 according to a second embodiment is now described with reference to FIGS. 12 to 14. In the fuel cell 110 according to the second embodiment, fuel gas and air flow to intersect with each other (crossflow), unlike the aforementioned first embodiment in which the fuel gas and the air flow in the opposite directions (counterflow). Furthermore, the fuel cell 110 is configured by stacking a plurality of power generation units 120. In the following, the structure of one power generation unit 120 is described.

Figure 12:
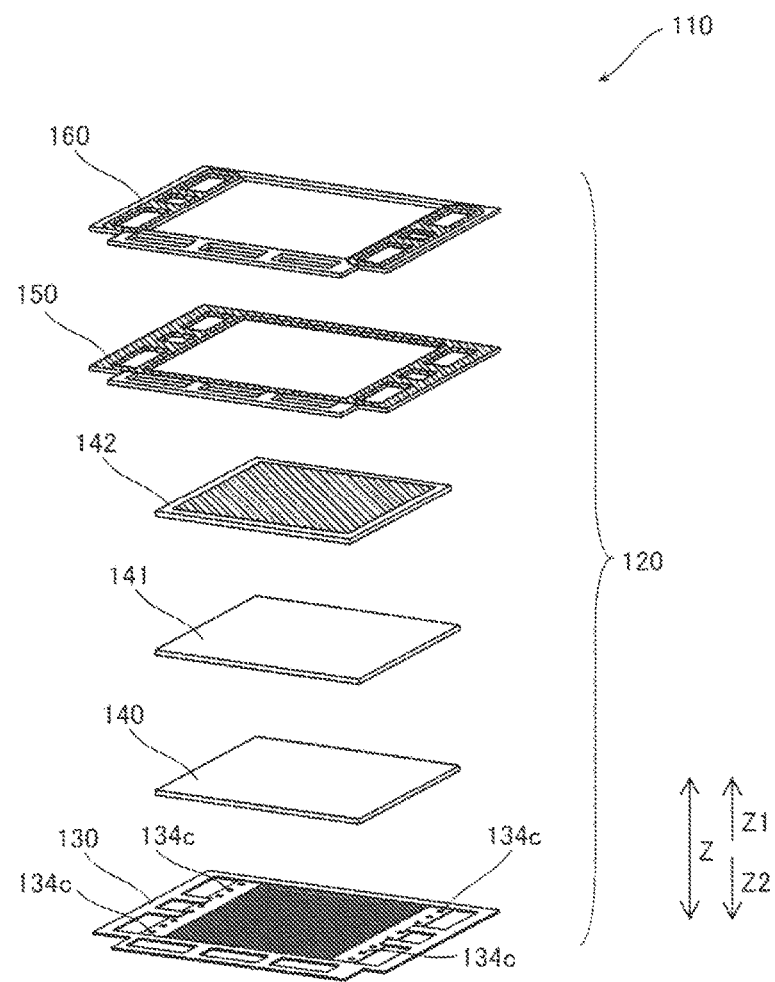
FIG. 12 An exploded perspective view of a fuel cell according to a second embodiment of the present invention.

As shown in FIG. 12, in the fuel cell 110 (power generation unit 120) according to the second embodiment, a cathode-anode assembly 130, a gas diffusion plate 140, an anode-side current collector member 141, a cell 142, an insulating portion 150, and a cell retainer 160 are stacked in this order from a lower side (Z2 direction side). The cell retainer 160 is an example of a "first seal member" in the present invention.

Figure 13:
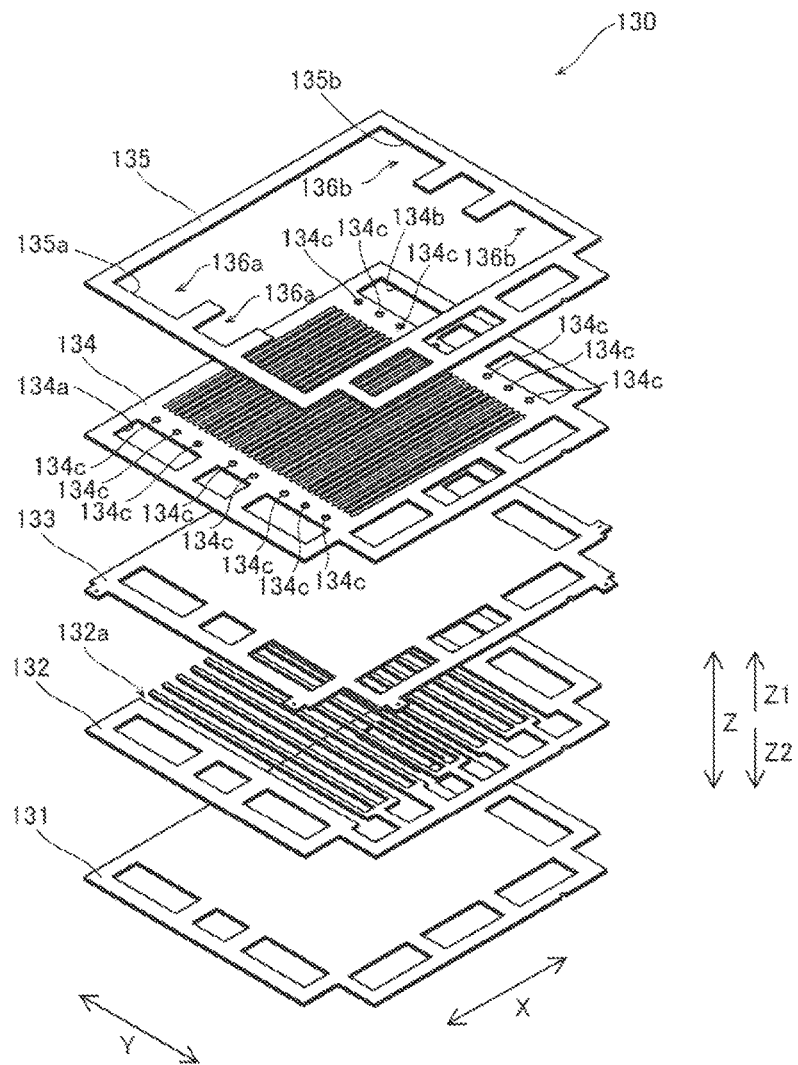
FIG. 13 An exploded perspective view of a cathode-anode assembly of the fuel cell according to the second embodiment of the present invention.
Figure 14:
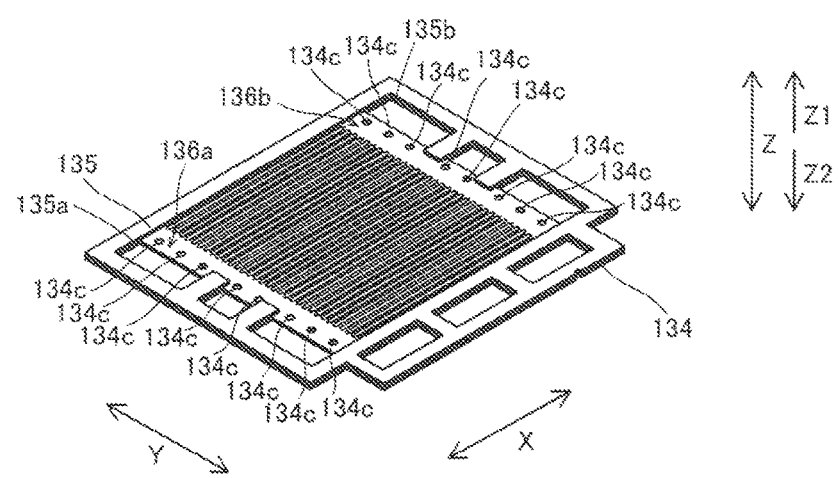
FIG. 14 A perspective view of a state where a cell holder is stacked on a separator of the fuel cell according to the second embodiment of the present invention.

As shown in FIG. 13, in the cathode-anode assembly 130, a current collector plate 131, a cathode plate 132, a separator 133, an anode plate 134, and a cell holder 135 are stacked in this order. According to the second embodiment, unlike the aforementioned first embodiment in which the separator 30 also serves as the portions connected to the anode 21 and the cathode 23, the cathode plate 132, the separator 133, and the anode plate 134 are provided separately from each other. The cathode plate 132 and the anode plate 134 are examples of a "cathode connection" and an "anode connection" in the present invention, respectively.

In the fuel cell 110, the fuel gas flows along a direction X on the upper surface (Z1 direction side) of the anode plate 134. Furthermore, the air flows along a direction Y on the cathode plate 132 (grooves 132a). Thus, in the fuel cell 110, the fuel gas and the air flow to intersect with each other (crossflow).

As shown in FIG. 13, on the outer peripheral side of the anode plate 134, three fuel gas inlets 134a and three fuel gas outlets 134b are provided. In the vicinity of the fuel gas inlets 134a and in the vicinity of the fuel gas outlets 134b, a plurality of convex supports 134c is provided. Incidentally, the convex supports 134c are formed by pressing the anode plate 134.

On the outer peripheral side of the cell holder 135, a fuel gas inlet 135a and a fuel gas outlet 135b are provided. In addition, the cell holder 135 is provided with an inflow passage 136a and an outflow passage 136b that are communicated with the fuel gas inlet 135a and the fuel gas outlet 135b, respectively. As shown in FIG. 14, in a state where the anode plate 134 and the cell holder 135 are stacked, the insulating portion 150 and the cell retainer 160 are supported by the convex supports 134c through the inflow passage 136a and the outflow passage 136b.

The remaining structures and the effects of the second embodiment are similar to those of the aforementioned first embodiment.

[Modifications]

The embodiments and Examples disclosed this time must be considered as illustrative in all points and not restrictive. The range of the present invention is shown not by the above description of the embodiments and Examples but by the scope of claims for patent, and all modifications within the meaning and range equivalent to the scope of claims for patent are further included.

For example, while the example in which the fuel cell is a solid oxide fuel cell (SOFC) has been shown in each of the aforementioned first and second embodiments, the present invention is not restricted to this. For example, the fuel cell may be a polymer electrolyte fuel cell (PEFC), a phosphoric acid fuel cell (PAFC), a molten carbonate fuel cell (MCFC), or the like, which is a fuel cell other than the solid oxide fuel cell.

While the example in which the convex supports are provided on the separator (anode plate) has been shown in each of the aforementioned first and second embodiments, the present invention is not restricted to this. For example, convex supports provided separately from the separator (anode plate) may be sandwiched between the separator (anode plate) and the insulating portion.

Figure 15:
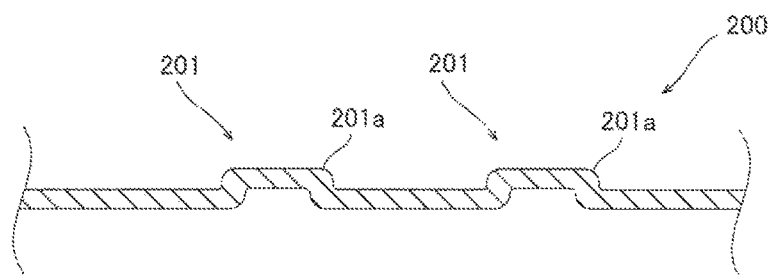
FIG. 15 A sectional view of a convex supporting portion of a fuel cell according to a modification of the first and second embodiments of the present invention.

While the example in which the tips of the convex supports each are substantially spherical has been shown in each of the aforementioned first and second embodiments, the present invention is not restricted to this. For example, as convex supports 201 of a fuel cell 200 according to a modification shown in FIG. 15, tips 201a of the convex supports 201 may be substantially truncated-cone-shaped with rounded corners.

While the example in which the plurality of convex supports is provided for the single inflow passage has been shown in each of the aforementioned first and second embodiments, the present invention is not restricted to this. When the width of the inflow passage is relatively small, for example, one convex support may be provided for the single inflow passage.

While the example in which the convex supports are formed by pressing the separator (anode plate) has been shown in each of the aforementioned first and second embodiments, the present invention is not restricted to this. According to the present invention, the convex supports may be formed by a method other than pressing.

While the example in which the separator also serves as the portion electrically connected to the anode and the portion electrically connected to the cathode has been shown in the aforementioned first embodiment, the present invention is not restricted to this. For example, as in the second embodiment, the portion (anode plate) electrically connected to the anode, the portion (cathode plate) electrically connected to the cathode, and the separator for separating the adjacent power generation unit may be provided separately from each other.

While the example in which in the protrusion height of each of the convex supports is equal to the thickness obtained by adding the thickness of the cell holder and the thickness of the holder seal has been shown in the aforementioned first embodiment, the present invention is not restricted to this. For example, the protrusion height of each of the convex supports may be smaller than the thickness obtained by adding the thickness of the cell holder and the thickness of the holder seal.

While the example in which the notches are used as the release passage according to the present invention has been shown in the aforementioned first embodiment, the present invention is not restricted to this. For example, grooves may be used as the release passage according to the present invention.

DESCRIPTION OF REFERENCE NUMERALS 10, 120: power generation unit
20, 142: cell
21: anode
23: cathode
30: separator
30a: surface (anode connection)
30b: surface (cathode connection)
34, 134c: support
34a, 201a: tip
35: recess
36a to 36d: notch (release passage)
40, 135: cell holder
42a, 42b: fuel gas inlet (fuel gas manifold)
43a, 43b: air inlet (air manifold)
44, 136a: inflow passage
48: holder seal (second seal member)
50, 150: insulating portion
60, 160: cell retainer (first seal member)
64: glass-based bonding material
100, 110, 200: fuel cell
132: cathode plate (cathode connection)
134: anode plate (anode connection)

The invention claimed is:

1. A fuel cell configured by stacking a plurality of power generation units, wherein
the power generation units each comprise:
a cell formed with a cathode on at least one surface;
a frame-shaped cell holder provided to surround an outside of the cell;
an insulating portion provided on a surface of the cell holder; and
a first seal member provided to lie across the cell and the insulating portion not to contact the cathode of the cell,
the cell holder is provided with an inflow passage for allowing fuel gas to flow into a frame of the cell holder from a fuel gas manifold provided on an outer peripheral side, and
a convex support for supporting the insulating portion and the first seal member is provided in the inflow passage.

2. The fuel cell according to claim 1, wherein
the cell is formed with an anode on a surface opposite to the surface on which the cathode is formed,
the power generation units each further comprise:
an anode connection electrically connected to the anode of the cell; and
a cathode connection electrically connected to the cathode of the cell,
the convex support is provided on a portion of the anode connection that corresponds to the inflow passage of the frame-shaped cell holder, and
the convex support provided on the anode connection supports the insulating portion and the first seal member through the inflow passage.

3. The fuel cell according to claim 1, wherein
the convex support has a substantially circular shape in a planar view.

4. The fuel cell according to claim 3, wherein
a tip of the convex support is substantially spherical or substantially truncated-cone-shaped with rounded corners.

5. The fuel cell according to claim 1, wherein
a plurality of convex supports is provided for the single inflow passage.

6. The fuel cell according to claim 5, wherein
a width of a gap between the plurality of convex supports is larger than a width of each of the convex supports in a direction perpendicular to a direction in which the convex supports protrude.

7. The fuel cell according to claim 1, further comprising a second seal member provided between the cell holder and the insulating portion, wherein
a protrusion height of the convex support is not more than a thickness obtained by adding a thickness of the cell holder and a thickness of the second seal member.

8. The fuel cell according to claim 1, wherein
the power generation units each further comprise:
an anode connection electrically connected to an anode of the cell; and
a cathode connection electrically connected to the cathode of the cell,
the anode connection and the cathode connection electrically connected to the cathode of another power generation unit to be stacked are integrally formed, and also serve as a separator for separating an adjacent power generation unit, and
the convex support is formed by pressing the separator.

9. The fuel cell according to claim 8, wherein
a recess is formed on a back side of the convex support formed by pressing, and
a release passage for releasing, to an outside of the separator, air that flows into the recess from an air manifold provided on an outer peripheral side of the separator is provided on a portion of the separator near the recess.

10. The fuel cell according to claim 1, wherein
a glass-based bonding material is arranged on a surface of the first seal member.

* * * * *